United States Patent
Lee et al.

(10) Patent No.: US 8,078,794 B2
(45) Date of Patent: Dec. 13, 2011

(54) HYBRID SSD USING A COMBINATION OF SLC AND MLC FLASH MEMORY ARRAYS

(75) Inventors: Charles C. Lee, Cupertino, CA (US);
David Q. Chow, San Jose, CA (US);
Abraham Chih-Kang Ma, Fremont, CA (US); I-Kang Yu, Palo Alto, CA (US);
Ming-Shiang Shen, Taipei Hsien (TW)

(73) Assignee: Super Talent Electronics, Inc., San Jose, CA (US)

( * ) Notice: Subject to any disclaimer, the term of this patent is extended or adjusted under 35 U.S.C. 154(b) by 623 days.

(21) Appl. No.: 11/926,743

(22) Filed: Oct. 29, 2007

(65) Prior Publication Data

US 2008/0215800 A1    Sep. 4, 2008

(51) Int. Cl.
*G06F 13/00*    (2006.01)
(52) U.S. Cl. ................ 711/103; 711/E12.083
(58) Field of Classification Search ............ None
See application file for complete search history.

(56) References Cited

U.S. PATENT DOCUMENTS

| | | | |
|---|---|---|---|
| 5,623,552 A | 4/1997 | Lane | |
| 5,907,856 A | 5/1999 | Estakhri et al. | |
| 5,959,541 A | 9/1999 | DiMaria et al. | |
| 6,000,006 A | 12/1999 | Bruce et al. | |
| 6,012,636 A | 1/2000 | Smith | |
| 6,069,920 A | 5/2000 | Schulz et al. | |
| 6,081,858 A | 6/2000 | Abudayyeh et al. | |
| 6,125,192 A | 9/2000 | Bjorn et al. | |
| 6,193,152 B1 | 2/2001 | Fernando et al. | |
| 6,202,138 B1 | 3/2001 | Estakhri et al. | |
| 6,230,233 B1 | 5/2001 | Lofgren et al. | |
| 6,275,894 B1 | 8/2001 | Kuo et al. | |
| 6,321,478 B1 | 11/2001 | Klebes | |
| 6,324,620 B1 * | 11/2001 | Christenson et al. | 711/112 |
| 6,418,009 B1 * | 7/2002 | Brunette | 361/306.3 |
| 6,547,130 B1 | 4/2003 | Shen | |
| 6,636,929 B1 | 10/2003 | Frantz et al. | |
| 6,718,407 B2 | 4/2004 | Martwick | |
| 6,880,024 B2 | 4/2005 | Chen et al. | |
| 7,103,765 B2 | 9/2006 | Chen | |
| 7,228,299 B1 * | 6/2007 | Harmer et al. | 707/3 |
| 7,257,714 B1 | 8/2007 | Shen | |
| 2001/0043174 A1 | 11/2001 | Jacobsen et al. | |
| 2002/0166023 A1 | 11/2002 | Nolan et al. | |
| 2003/0046510 A1 | 3/2003 | North | |
| 2003/0163656 A1 | 8/2003 | Ganton | |
| 2004/0148482 A1 | 7/2004 | Grundy et al. | |
| 2004/0255054 A1 | 12/2004 | Pua et al. | |
| 2005/0102444 A1 | 5/2005 | Cruz | |

(Continued)

*Primary Examiner* — Pierre-Michel Bataille
*Assistant Examiner* — Sean D Rossiter
(74) *Attorney, Agent, or Firm* — Roger H. Chu

(57) ABSTRACT

Hybrid solid state drives (SSD) using a combination of single-level cell (SLC) and multi-level cell (MLC) flash memory arrays are described. According to one aspect of the present invention, a hybrid SSD is built using a combination SLC and MLC flash memory arrays. The SSD also includes a micro-controller to control and coordinate data transfer from a host computing device to either the SLC flash memory array of the MLC flash memory array. A memory selection indicator is determined by triaging data file based on one or more criteria, which include, but is not limited to, storing system files and user directories in the SLC flash memory array and storing user files in the MLC flash memory array; or storing more frequent access files in the SLC flash memory array, while less frequent accessed files in the MLC flash memory array.

20 Claims, 14 Drawing Sheets

U.S. PATENT DOCUMENTS

| | | |
|---|---|---|
| 2005/0120146 A1 | 6/2005 | Chen et al. |
| 2005/0160213 A1 | 7/2005 | Chen |
| 2005/0193161 A1 | 9/2005 | Lee et al. |
| 2005/0246243 A1 | 11/2005 | Adams et al. |
| 2005/0251617 A1* | 11/2005 | Sinclair et al. ............... 711/103 |
| 2005/0268082 A1 | 12/2005 | Poisner |
| 2006/0065743 A1 | 3/2006 | Fruhauf |
| 2006/0075174 A1 | 4/2006 | Vuong |
| 2006/0106962 A1 | 5/2006 | Woodbridge et al. |
| 2006/0161725 A1 | 7/2006 | Lee et al. |
| 2006/0206702 A1 | 9/2006 | Fausak |
| 2006/0242395 A1 | 10/2006 | Fausak |
| 2006/0271731 A1* | 11/2006 | Kilian et al. ................... 711/108 |
| 2007/0113267 A1 | 5/2007 | Iwanski et al. |
| 2008/0104309 A1* | 5/2008 | Cheon et al. .................. 711/103 |
| 2008/0112238 A1* | 5/2008 | Kim et al. ..................... 365/200 |
| 2008/0126680 A1* | 5/2008 | Lee et al. ....................... 711/103 |
| 2009/0100244 A1* | 4/2009 | Chang et al. .................. 711/172 |
| 2009/0248965 A1* | 10/2009 | Lee et al. ....................... 711/103 |
| 2010/0082883 A1* | 4/2010 | Chen et al. .................... 711/103 |

* cited by examiner

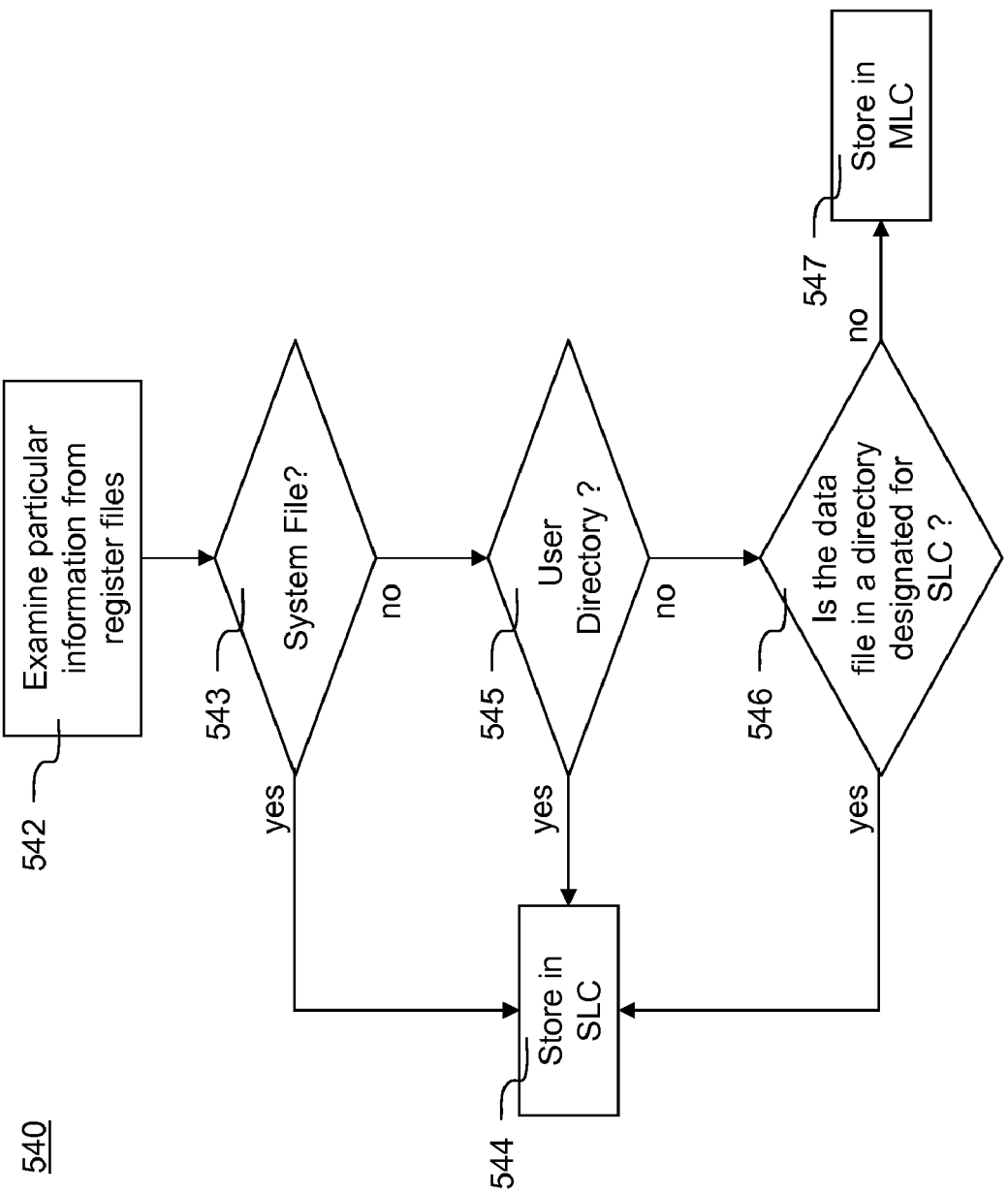

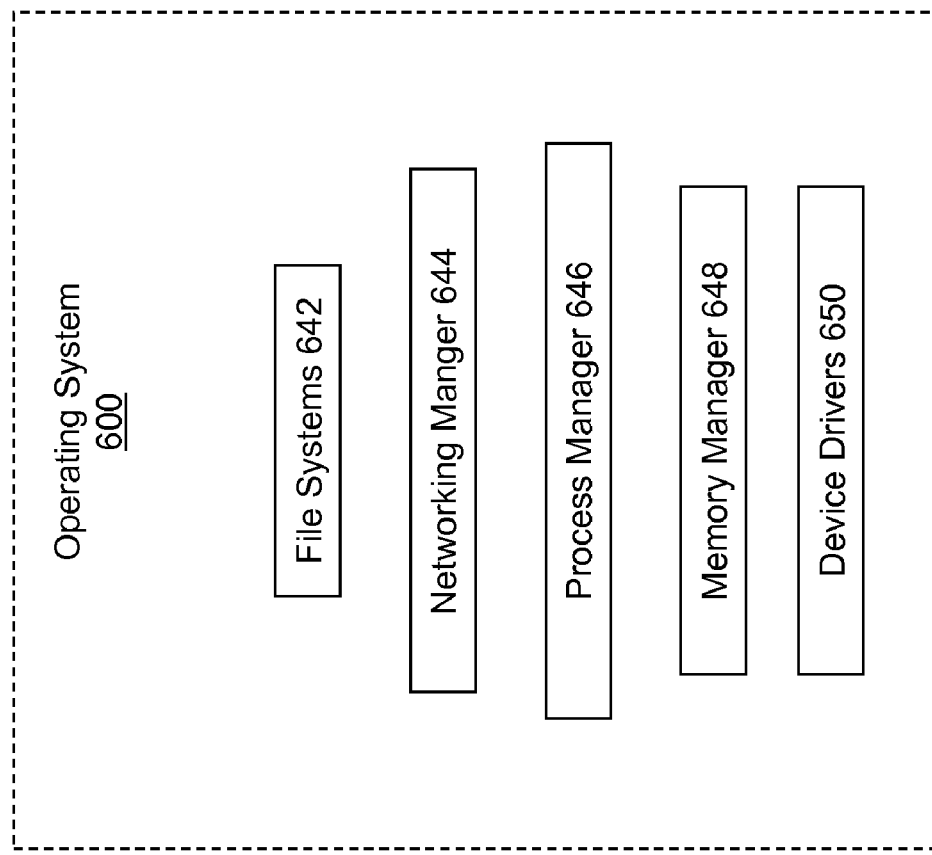

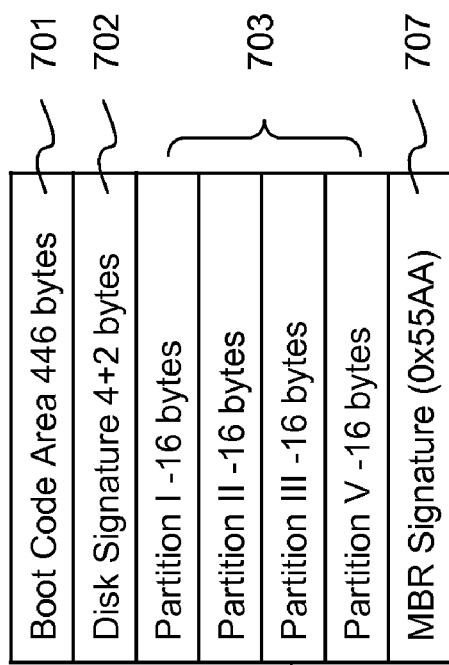
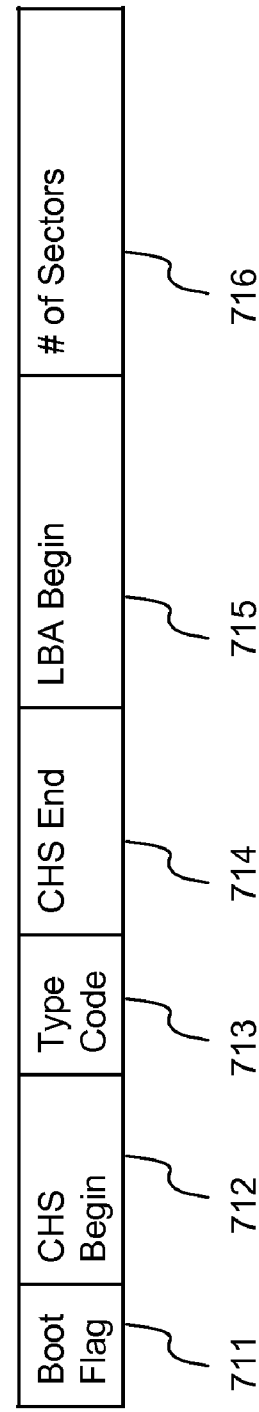
FIG. 7A

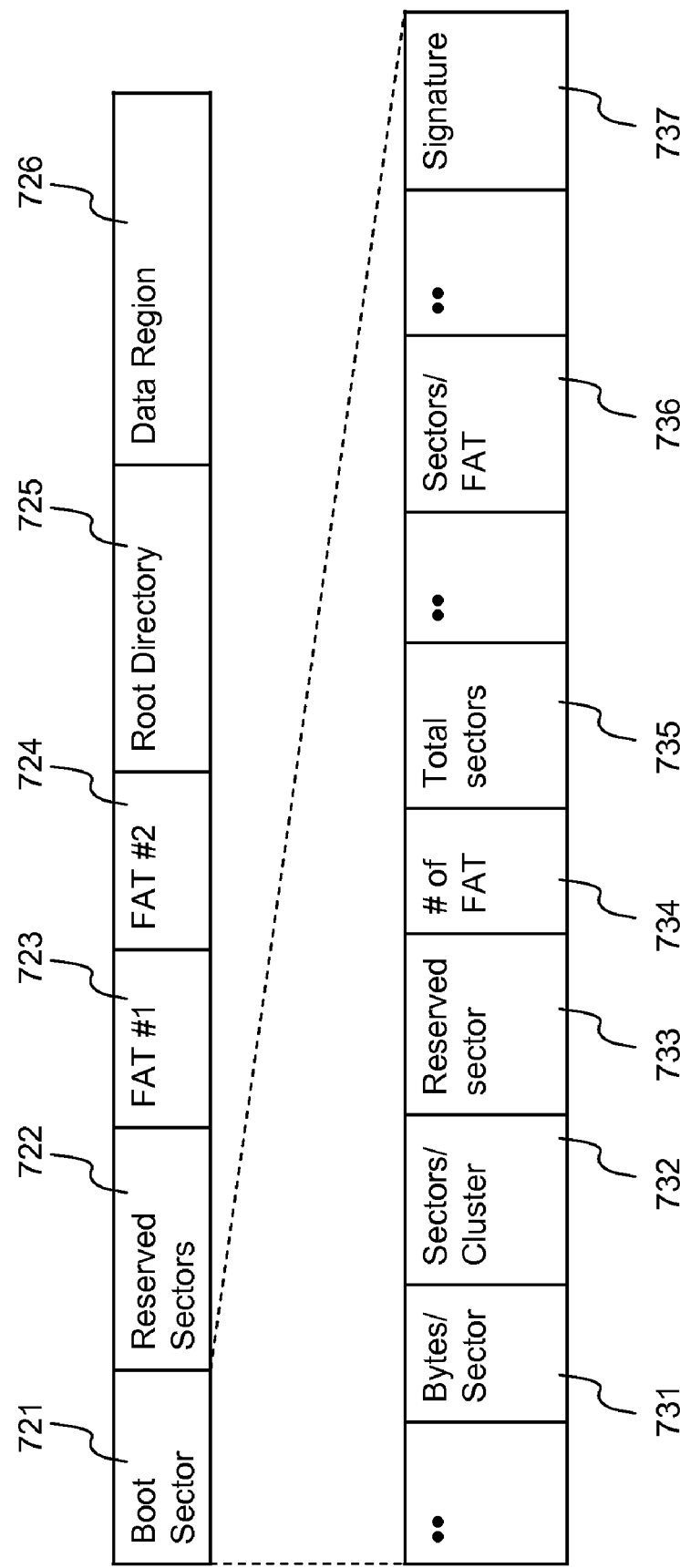

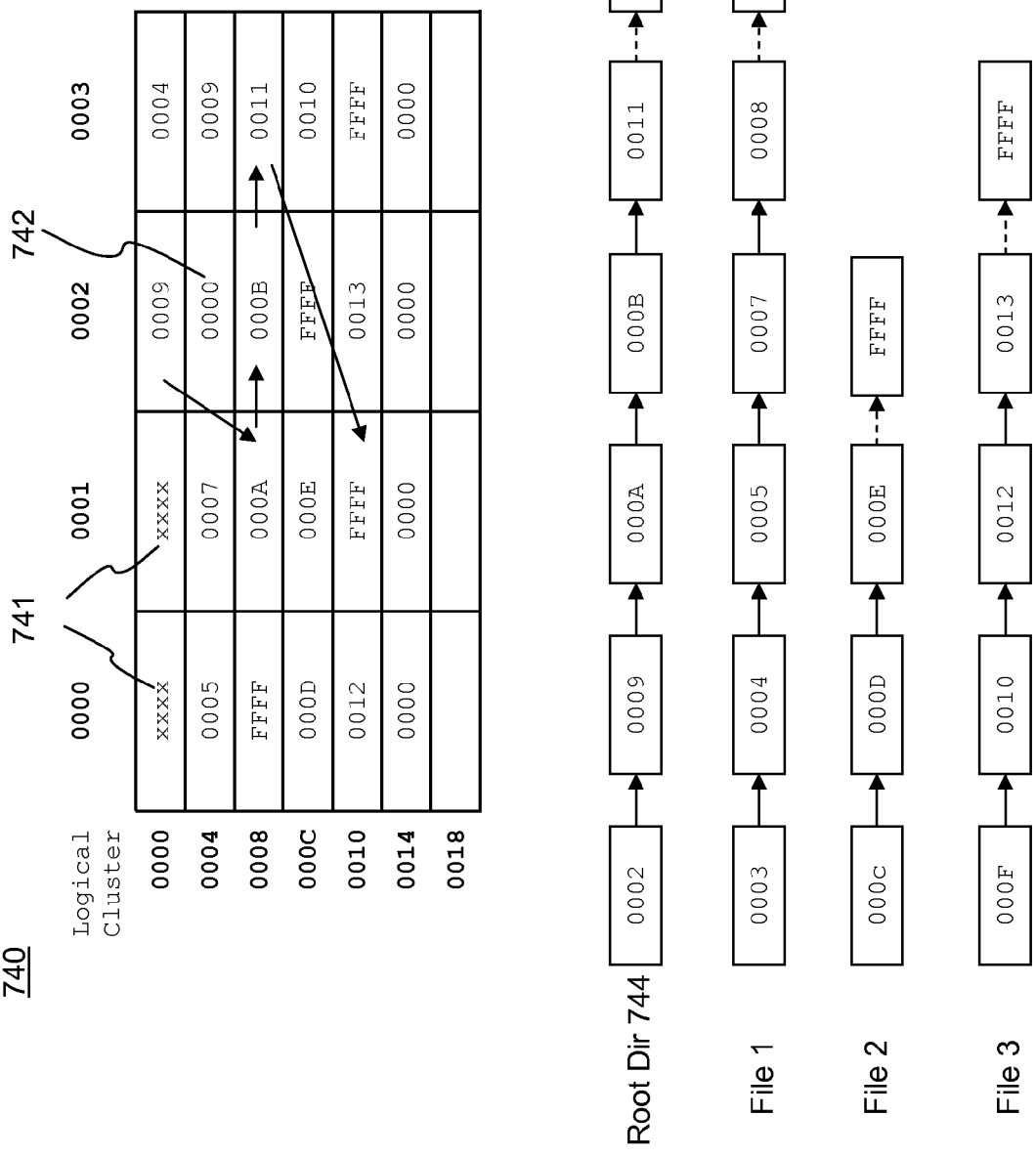

FIG. 7D

File and Directory Data Structure
750

| File Name | File Ext | Attrib | Time | Date | Start Cluster # | File Size |
|---|---|---|---|---|---|---|
| 751 | 752 | 753 | 754 | 755 | 756 | 757 |

| | | |
|---|---|---|
| Example 1 | 43 4F 4E 46 49 47 20 20   53 59 53 20   00 00 00 00<br>00 00 00 00 00 00 25 43   AF 20 02 00   9C 03 00 00 | "Config.sys" |
| Example 2 | 2E 00 00 00 00 00 00 00   00 00 00 00   00 00 00 00<br>⌣ 358 | "." current directory |
| Example 3 | 2E 2E 00 00 00 00 00 00   00 00 00 00   00 00 00 00<br>⌣ 359 | ".." parent directory |
| Example 4 | E5 00 00 00 00 00 00 00   00 00 00 00   00 00 00 00<br>⌣ 360 | deleted file |

_US 8,078,794 B2_

HYBRID SSD USING A COMBINATION OF SLC AND MLC FLASH MEMORY ARRAYS

FIELD OF THE INVENTION

The present invention relates to secondary storage devices such as solid state drive (SSD), and more particularly to a hybrid SSD devices using a combination of single-level cell (SLC) and multi-level cell (MLC) flash memory array.

BACKGROUND OF THE INVENTION

Portable electronic storage device such as USB flash drive has become popular in the past few years replacing other forms of storage media such as floppy disk, removable storage, CD-ROM and DVD commonly used in a computing device. Latest trend is to use flash memory as non-volatile memory (e.g., NAND flash) to build a secondary storage device such as solid state drive (SSD). SSDs do not require batteries and do not have any moving parts hence eliminating seek time, latency and other electro-mechanical delays inherent in conventional disk drives.

There are two types of flash memories today, single-level cell (SLC) flash memory and multi-bit cell (MBC) or multi-level cell (MLC) flash memory. SLC flash memory stores one-bit of data per cell, while MBC or MLC flash memory stores more than one bits (e.g., 2, 4 or other higher power of 2 bits) of data per cell. MLC flash memory has cheaper manufacturing costs than SLC does for same amount of storage or on a per MB (Mega Byte) basis.

Currently, SSDs are built using the higher cost SLC flash memory instead of MLC mainly due to one reason—relative higher data endurance (i.e., number of write/erase cycles). The problem associated with this approach is that the cost is too high for many practical applications or usages. One solution is to use MLC flash memory in a SSD. However, the data endurance rate of MLC based SSD could drop as much as a factor of ten (10) comparing to the SLC based SSD. This is not valid solution. Therefore it would be desirable to have an improved SSD device that overcomes the problems described herein.

BRIEF SUMMARY OF THE INVENTION

This section is for the purpose of summarizing some aspects of the present invention and to briefly introduce some preferred embodiments. Simplifications or omissions in this section as well as in the abstract and the title herein may be made to avoid obscuring the purpose of the section. Such simplifications or omissions are not intended to limit the scope of the present invention.

Hybrid solid state drives (SSD) using a combination of single-level cell (SLC) and multi-level cell (MLC) flash memory arrays are disclosed. According to one aspect of the present invention, a hybrid SSD is built using a combination SLC and MLC flash memory arrays. The SSD also includes a micro-controller to control and coordinate data transfer from a host computing device to either the SLC flash memory array or the MLC flash memory array. A memory selection indicator is determined by triaging data file based on one or more criteria, which include, but is not limited to, storing system files and user directories in the SLC flash memory array and storing user files in the MLC flash memory array; or storing more frequent access files in the SLC flash memory array, while less frequent accessed files in the MLC flash memory array.

According to an exemplary embodiment of the present invention, a hybrid solid state drive includes at least the following: an interface configured for receiving data transfer commands from a host computing device, each of the received data transfer commands includes either a data read or a data write request; a single-level cell (SLC) flash memory array; a multi-level cell (MLC) flash memory array; a micro-controller configured for controlling the interface, the SLC flash memory array and MLC flash memory array, the microprocessor extracts particular characteristics of a data file associated with said each of the received data transfer commands, and then, based on the particular characteristics for the data write request, a memory selection indicator is determined by triaging the data file to be stored in either the SLC flash memory array or the MLC flash memory array based on one or more criteria; and an address mapping memory, coupling to the micro-controller, configured to correlate logical block address (LBA) of the data file to a physical block address (PBA) associated with one of the SLC flash memory array and the MLC flash memory array according to the memory selection indicator.

The hybrid solid state drive further includes a read cache configured to be a first buffer holding data blocks to be transferred to the host computing device, a write cache configured to be a second buffer holding data blocks to be written to either the SLC or MLC flash memory array, one or more register files configured to hold the particular characteristics for the micro-controller, and a memory switch configured to switch between the SLC flash memory array and the MLC flash memory array based on the memory selection indicator.

According to another exemplary embodiment of the present invention, a method of writing data in a hybrid solid state drive (SSD) includes at least the following steps: receiving data transfer commands; determining whether each of the received data transfer commands is a data read or a data write request; when the data write request is determined, extracting particular characteristics of a data file associated with said each of the received data transfer commands; constructing a memory selection indicator by triaging the data file to be stored in either a SLC flash memory array or a MLC flash memory array using the particular characteristics based on one or more criteria; correlating logical block address (LBA) of the data file to a physical block address (PBA) associated with one of the SLC flash memory array and the MLC flash memory array according to the memory selection indicator; and writing data blocks to the physical block address accordingly.

The method further includes pre-storing the data blocks associated with LBA to a write cache when the data write request is determined and storing the particular characteristics of the data file into one or more register files of the micro-controller.

One of the objects, features, and advantages in the present invention is to use a smart data file triage method to ensure the lower manufacturing cost can be achieved by using a combination of SLC and MLC flash memory to build a SSD that has an acceptable level of data endurance. Other objects, features, and advantages of the present invention will become apparent upon examining the following detailed description of an embodiment thereof, taken in conjunction with the attached drawings.

BRIEF DESCRIPTION OF THE DRAWINGS

These and other features, aspects, and advantages of the present invention will be better understood with regard to the following description, appended claims, and accompanying drawings as follows:

FIGS. 5A-5E are flowcharts showing several alternative methods to triage files into SLC or MLC in the process of FIG. 4;

FIG. 6 is a diagram illustrating an operating system of the computing device of FIG. 1; and FIGS. 7A-7D are diagrams and examples showing data structures in an operating system which may be used by a micro-controller in the exemplary hybrid SSD of FIG. 2, according an embodiment of the present invention.

DETAILED DESCRIPTION

In the following description, numerous specific details are set forth in order to provide a thorough understanding of the present invention. However, it will become obvious to those skilled in the art that the present invention may be practiced without these specific details. The descriptions and representations herein are the common means used by those experienced or skilled in the art to most effectively convey the substance of their work to others skilled in the art. In other instances, well-known methods, procedures, components, and circuitry have not been described in detail to avoid unnecessarily obscuring aspects of the present invention.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Used herein, the terms "upper", "lower", "top", "bottom", "middle", "upwards", and "downwards" are intended to provide relative positions for the purposes of description, and are not intended to designate an absolute frame of reference. Further, the order of blocks in process flowcharts or diagrams representing one or more embodiments of the invention do not inherently indicate any particular order nor imply any limitations in the invention.

Embodiments of the present invention are discussed herein with reference to FIGS. 1-7D. However, those skilled in the art will readily appreciate that the detailed description given herein with respect to these figures is for explanatory purposes as the invention extends beyond these limited embodiments.

Figure 1:
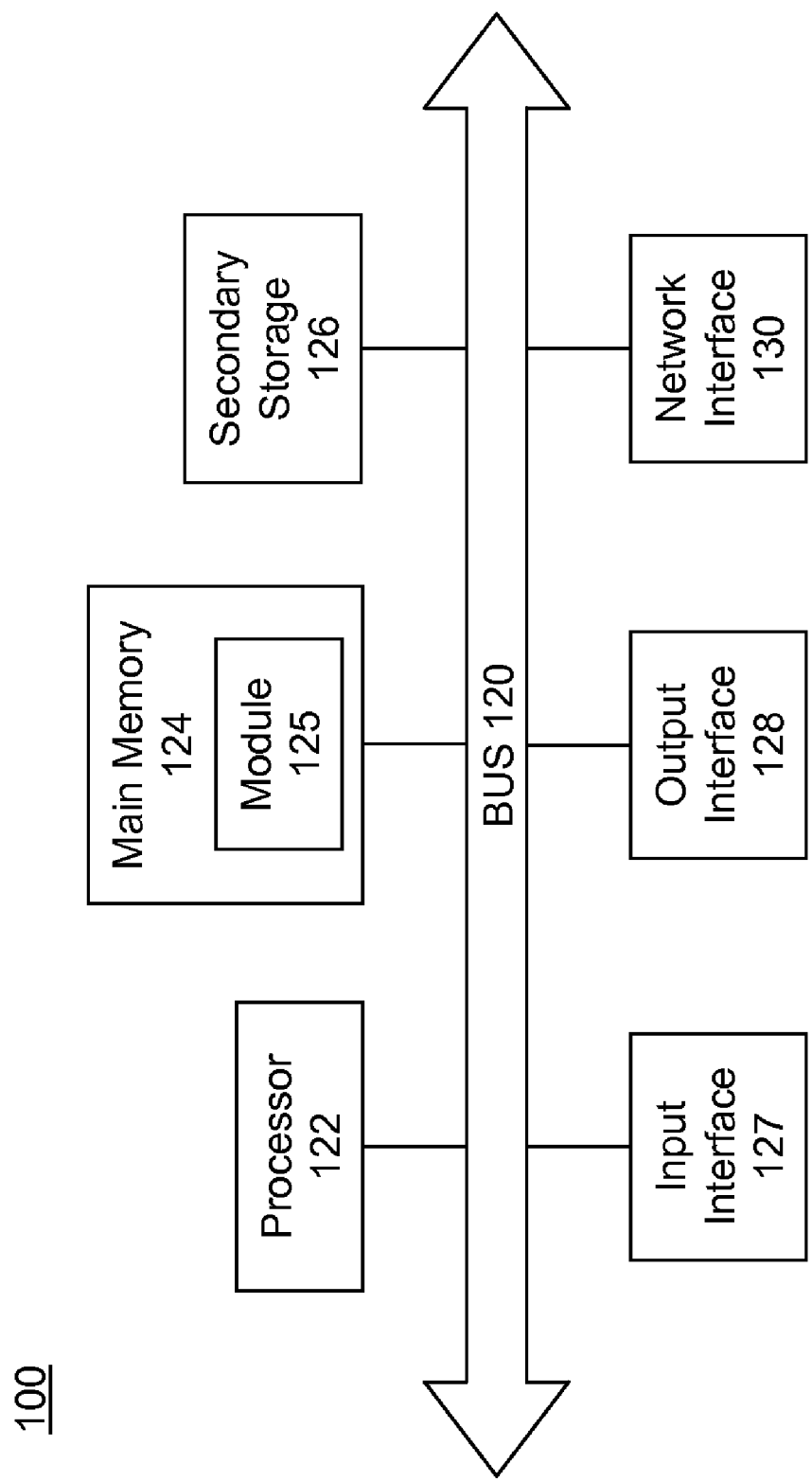
FIG. 1 is a simplified block diagram showing some components of a computing device in accordance with one embodiment of the present invention.

Referring now to the drawings, FIG. 1 is a simplified block diagram depicting a computing device 100 (e.g., a desktop, a laptop, etc.). The computing device 100 includes an internal data bus 120. Coupling to the data bus 120 are one or more processor 122, a main memory 124, preferably random access memory (RAM), one or more secondary storage devices 126 (e.g., hard disk drive, removable storage drive, etc.), one or more input interfaces 127 (e.g., keyboard, pointing device, etc.), one or more output interfaces 128 (e.g., display, printer, etc.) and an optional network interface 130. The processor 122 executes instructions from one or more modules 125 loaded in the main memory 124. The secondary storage device 126 is configured to store data and source of the module 125 (e.g., executable binary code) in a non-volatile medium, which can retain the stored information even when not powered. The network interface 130 is configured to facilitate data communication to another computing device over a data network (e.g., Internet) wired or wireless.

Figure 2:
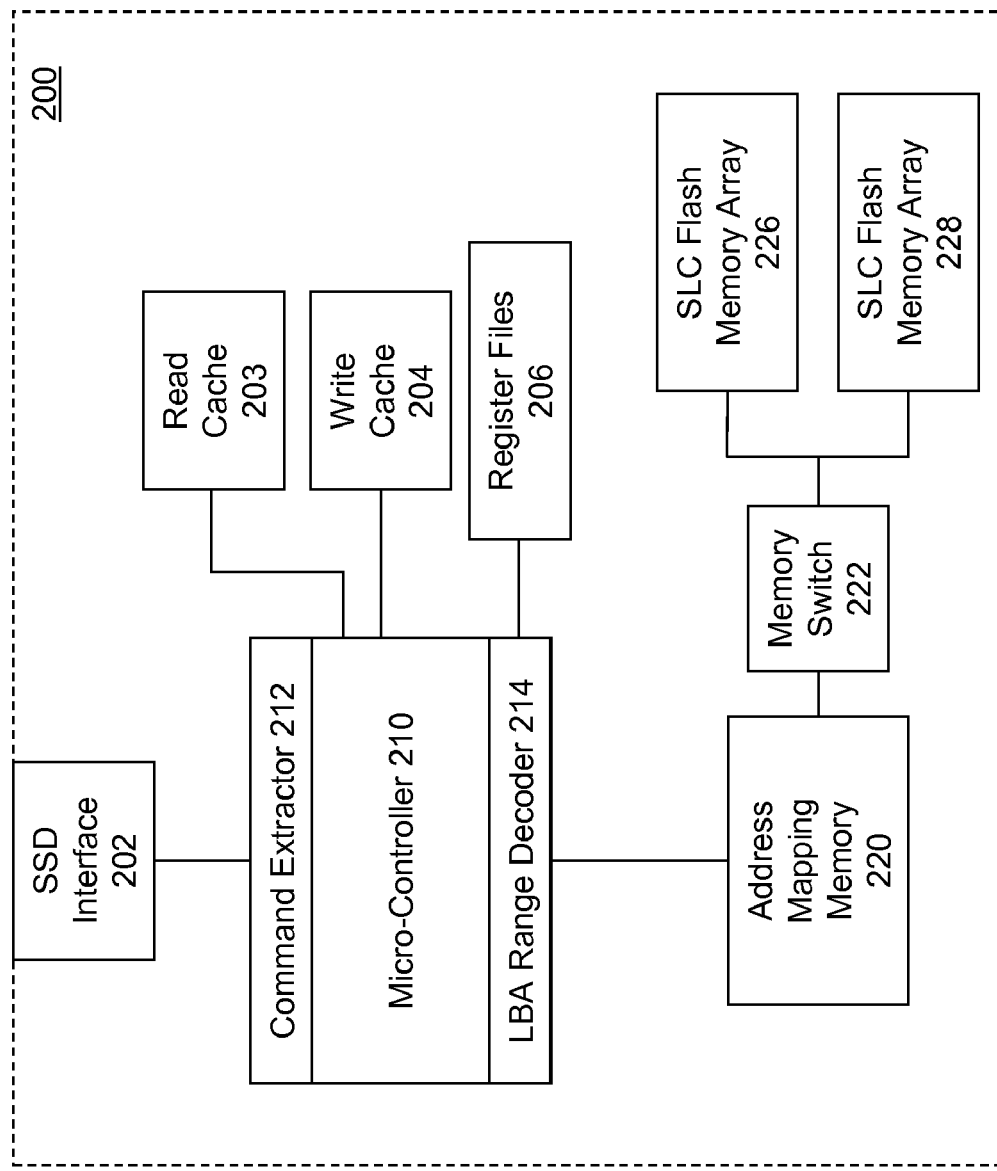
FIG. 2 is a block diagram showing salient components of an exemplary hybrid SSD may be used as a secondary storage of the computing system of FIG. 1 in accordance with one embodiment of the present invention.

FIG. 2 is a block diagram showing salient components of an exemplary hybrid solid state drive (SSD) 200 using a combination of SLC and MLC flash memory array in accordance with one embodiment of the present invention. The hybrid SSD 200 may be configured as a secondary storage for the computing device 100 of FIG. 1. The hybrid SSD 200 comprises a SSD interface 202, a micro-controller or controller 210, a data read cache 203, a data write cache 204, a set of register files 206, a logical-to-physical address mapping memory 220, a memory switch 222 that facilitates a switching function between a SLC flash memory array 226 and a MLC flash memory array 228.

The SSD interface 202 is configured for transferring data between the hybrid SSD 200 and a data host (e.g., the computing device 100 of FIG. 1) in one of the standards including, but not limited to, Advanced Technology Attachment (ATA), serial ATA (SATA), and Small Computer System Interface (SCSI). The micro-controller 210 (also MCU) is a computer-on-a-chip, which is a compact form of the computing device 100. The micro-controller 210 is configured for performing controlling the hybrid SSD 200 via various function units such as command extractor 212 and logical block address (LBA) range decoder 214. The command extractor 212 is configured to extract data transfer commands received through the SSD interface 202 from the host. One of the functions is to determine whether the command is a data read or write request. The LBA range decoder 214 is configured to determine the range of the received LBA based on metadata or characteristics of a data file or directory (i.e. file folder) associated with the data transfer command. The metadata or characteristics may include, but not necessarily be limited to, file name, file size, file creation date and time, file type, file location (e.g., starting cluster number).

The data read cache 203 and the data write cache 204 comprise volatile memory modules configured as data transfer buffer between the host and the hybrid SSD 200. The data read cache 203 is configured to keep recently requested data blocks or clusters. The data write cache 204 is configured to hold data in write requests to be stored. The register files 206 are configured to hold particular metadata of a data file relevant for various function units (e.g., LBA range decoder 214) to perform tasks. For example, particular data (e.g., starting cluster number and total number of clusters to be read or written) of the metadata may be loaded into the register files 206 by the micro-controller 210.

The logical-to-physical address mapping memory 220 (generally made of static RAM (SRAM)) is configured to map logical block address (LBA) to a physical block address, which includes a memory selection indicator for the memory switch 222 to direct data transfer to either the SLC flash memory array 226 or the MLC memory array 228. The hybrid SSD 200 may be configured to have various capacities (e.g., 32 GB, 64 GB, etc.) with different ratios between the SLC flash memory array 226 and the MLC flash memory array 228. The ratios may have a range between 10% and 90%. In other words, the amount of the SLC flash memory array versus the amount of the MLC flash memory array in the hybrid SSD 200 may be from 10% to 90% depending upon applications or usages. The present invention sets no limit as to what ratio to be used in the hybrid SSD. One ratio may work better in one particular embodiment while different ratios may perform better in others. For example, a hybrid SSD configured as a secondary storage for archival purpose, a very low ratio may be more suitable because the archival data is only written once. Therefore, MLC flash memory could provide enough data endurance and reliability.

It is noted that the SLC flash memory array 226 may include at least one flash memory chip. Likewise, the MLC flash memory array 228 may include at least one MLC flash memory chip.

Figure 3:
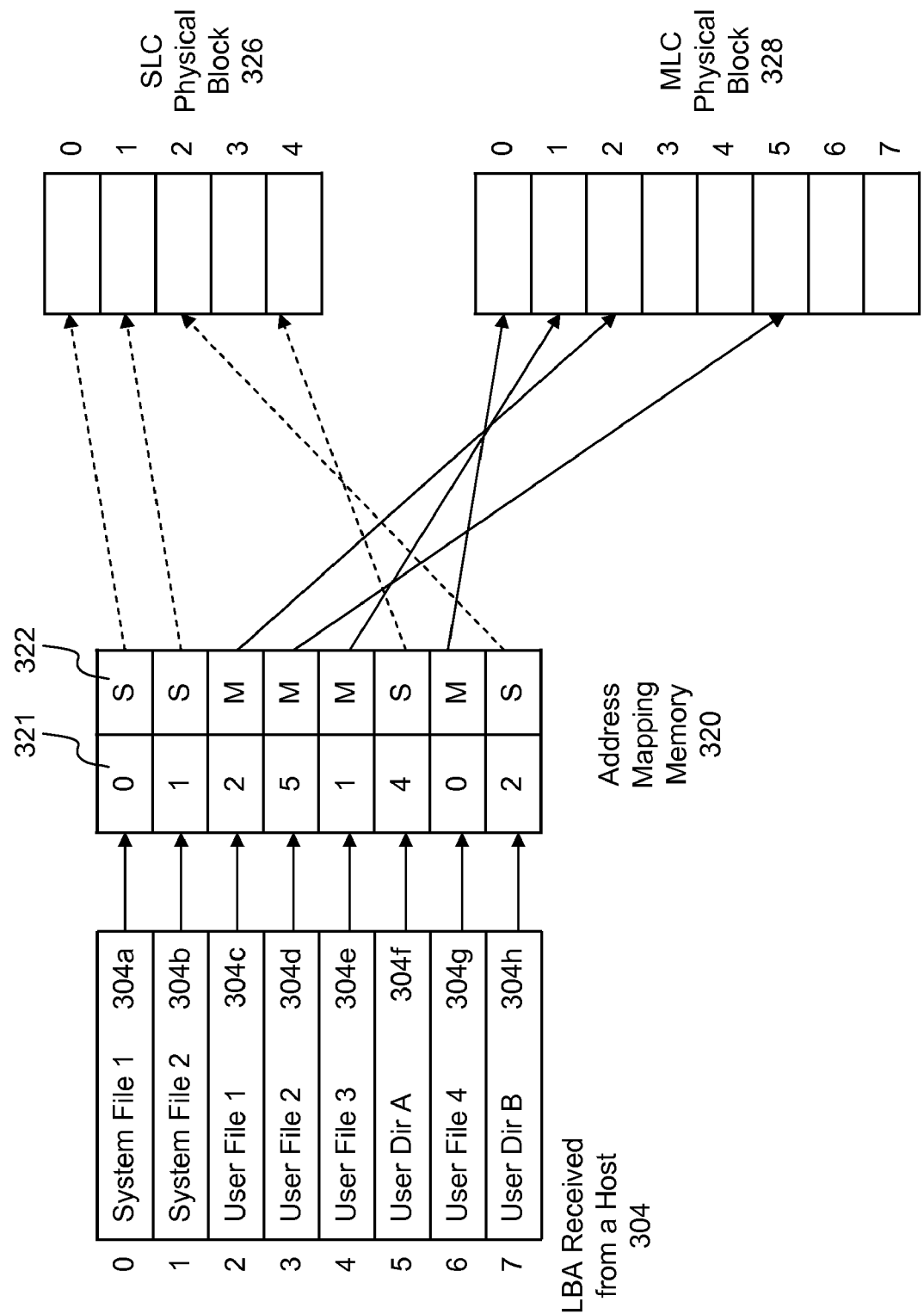
FIG. 3 is a diagram illustrating an exemplary scheme for mapping logical block address (LBA) of files in the hybrid SSD of FIG. 2 in accordance with one embodiment of the present invention.

Referring now to FIG. 3, which is a diagram of an exemplary scheme showing how LBA is mapped to physical address of either the SLC or MLC flash memory array in the hybrid SSD of FIG. 2, according to an embodiment of the present invention. In the scheme, eight LBAs 304 received from a host (e.g., received through the SSD interface 202) are listed as "system file 1" 304a, "system file 2" 304b, "user file 1" 304c, "user file 2" 304d, "user file 3" 304e, "user directory A" 304f, "user file 4" 304g and "user directory B" 304h. Each of the received LBAs 304a-h is mapped to a physical block address (PBA) as shown in the first column entry 321 in the address mapping memory 320. Corresponding entry in the second column 322 represents a memory selection indicator marking which type of flash memory array (i.e., SLC or MLC) to be stored. For example, "system file 1" 304a is mapped to physical block zero (0) of the SLC physical block address 326 of the SLC flash memory array 226; "system file 2" 304b mapped to physical block one (1) of the SLC; "user file 2" 304d mapped to physical block five (5) of the MCL physical block address 328; and so forth. Dotted lines represents a mapping to the SLC physical block address 326, while solid lines represents a mapping to the MLC physical block address 328. For clarity, content of the second column 322 is denoted using "S" for SLC and "M" for MLC in FIG. 3. Implementing this feature in the address mapping memory 220 may be accomplished with an indicative bit (e.g., 0 for SLC and 1 or MLC, or vice versa).

According to one aspect of the present invention, the mapping schemes between LBAs and PBAs are dependent upon definitions of cluster and sector with characteristics of the flash memory (i.e., blocks and pages). Since flash memory need to carry additional information for error correction code (ECC), the mapping schemes must include those factors.

According to another aspect of the present invention, the mapping scheme between LBAs 304 and PBAs of either the SLC flash memory array 326 or the MLC flash memory array 328 is configured to allow more efficient usages of the SLC and MLC flash memory array. The mapping scheme together with other techniques such as wear leveling can prolong data endurance of the hybrid SSD while maintaining a reasonable manufacturing cost, hence overcoming shortcomings of the prior art approach.

Figure 4:
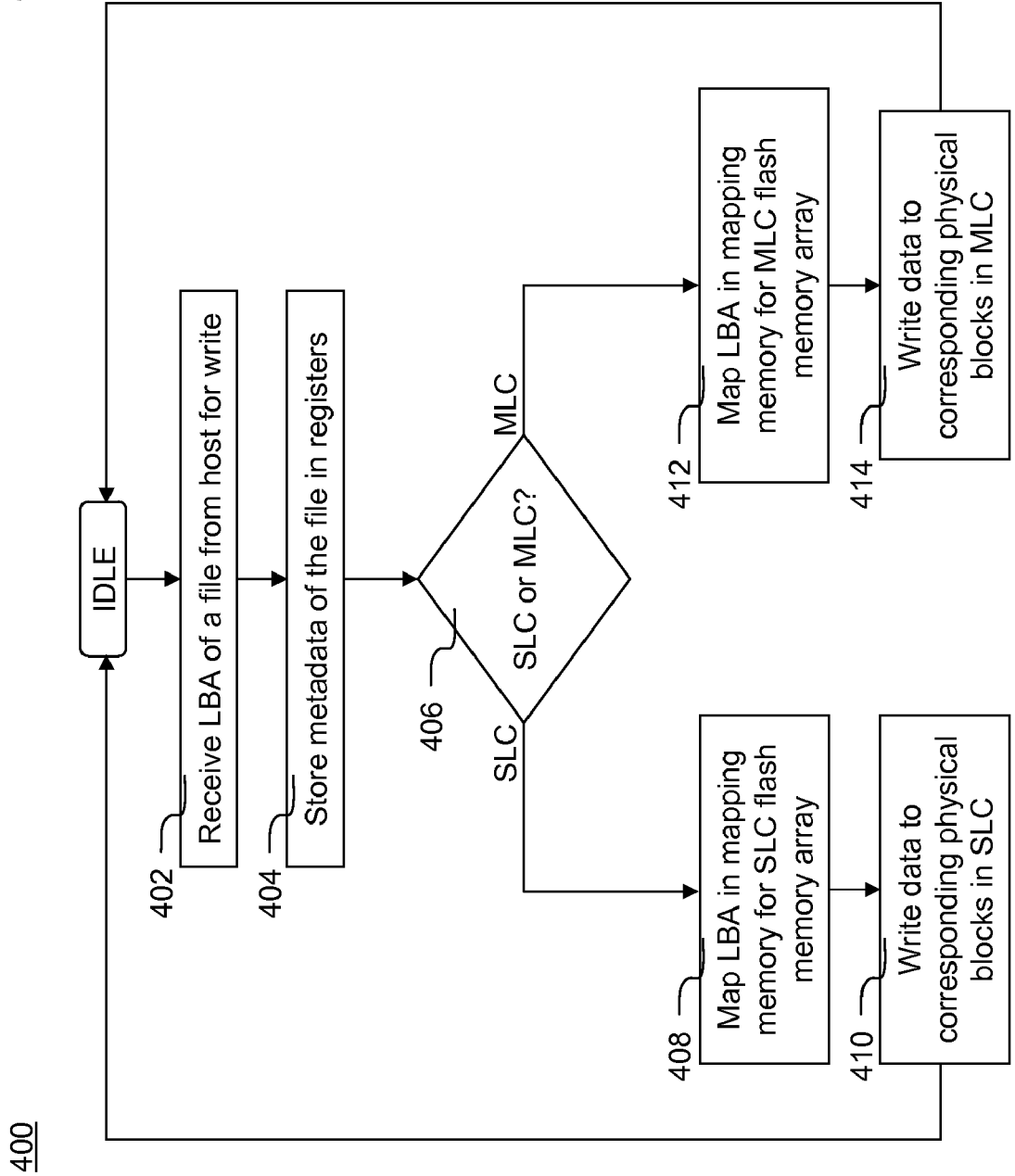
FIG. 4 is a flowchart illustrating an exemplary process of writing data in the hybrid SSD of FIG. 2, according to an embodiment of the present invention.

FIG. 4 is a flowchart illustrating an exemplary process 400 of writing data in the exemplary hybrid SSD 200 of FIG. 2, according to an embodiment of the present invention. Since writing data to flash memory is a concern for data endurance, the process 400 needs to be implemented in a robust manner to ensure longest possible data reliability out of a given hybrid SSD. The process 400 may be implemented in hardware, software or a combination of both. Generally process 400 is implemented in a micro-controller 210 of the hybrid SSD 200 of FIG. 2.

Process 400 starts with the micro-controller 210 in an "idle" state until a data write request is received at step 402. For example, the SSD interface 202 receives a data transfer command that is then extracted by the command extractor 212 to determine whether the command is a data write request. In the data write request, a logical block address (LBA) of a data file is provided. Next, at step 404, the micro-controller 210 stores particular metadata of the data file into the register files 206. For example, LBA range decoder 214 may need to store starting cluster address/number and total number of cluster of the data file.

Next, the process 400 moves to a decision 406, in which it is determined which one of the flash memory array (i.e., SLC or MLC) to store the data associated with the received LBA. There are a number of alternatives may be used in the present invention. Some of the alternative embodiments are shown in FIGS. 5A-5E and described in the corresponding description below.

If the result of decision 406 is "SLC", then the micro-controller 210 maps the received LBA in the address mapping memory 220 to a corresponding physical block address of the SLC flash memory array 226 at step 408. The micro-controller 210 finally writes the data into the SLC flash memory array 226 at the physical block address at step 410 before the process 400 moves back to the "idle" state. Otherwise, if the result of decision 406 is "MLC", then the micro-controller 210 maps the received LBA in the address mapping memory 220 to a corresponding physical block address of the MLC flash memory array 228 at step 412. The micro-controller 210 writes the data to the physical block address of the MLC flash memory array 228 at step 414 before the process 400 goes back to the "idle" state.

Figure 5A:
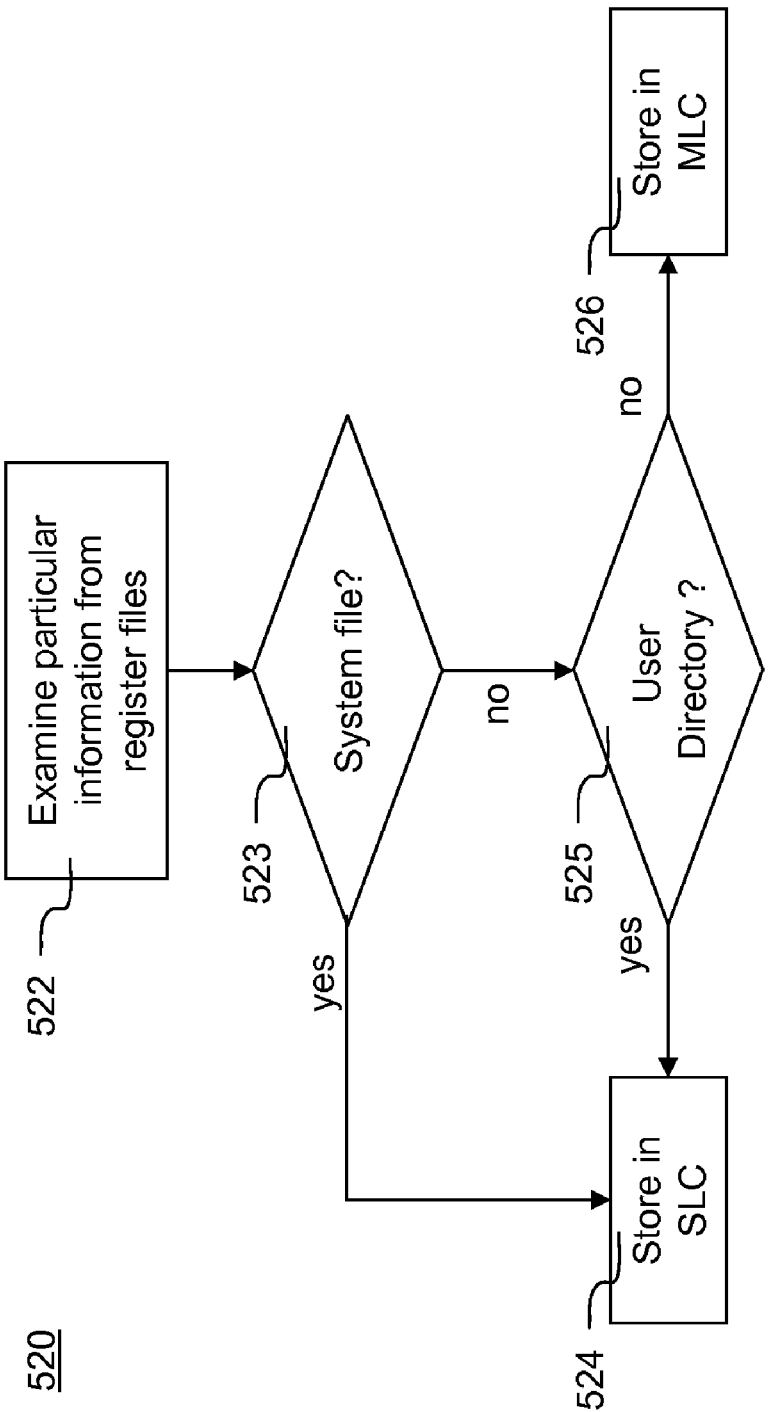

FIGS. 5A-5E are flowcharts showing several alternative methods to triage files into SLC or MLC in the process of FIG. 4. FIG. 5A shows a first alternative exemplary process 520 of triaging a data file to determine which one of the flash memory array (i.e., SLC or MLC) to store into, according to one embodiment of the present invention. The first process 520 represents the decision 406 of the process 400 of FIG. 4. The process 520 starts at step 522 by examining particular metadata of the data file of a data write request stored in the register files 206 of the hybrid SSD 200 of FIG. 2. Next, the process 520 moves to a decision 523 to determine if the data file is a system file or not. If this is a system file (e.g., master boot record, file allocation table, partition boot sector, root directory, etc.). If "yes", the system file is marked to be stored in SLC at step 524. Otherwise the data file is a user file. The process 520 follows the "no" branch to another decision 525, in which it is determine whether the data file is a user file or a user directory. If it is a directory, the process 520 goes to step 524 marking the user directory to be stored in the SLC flash memory array. If it is not a directory, the process 520 moves to step 526 marking the user file to be stored in the MLC flash memory array.

Figure 5B:
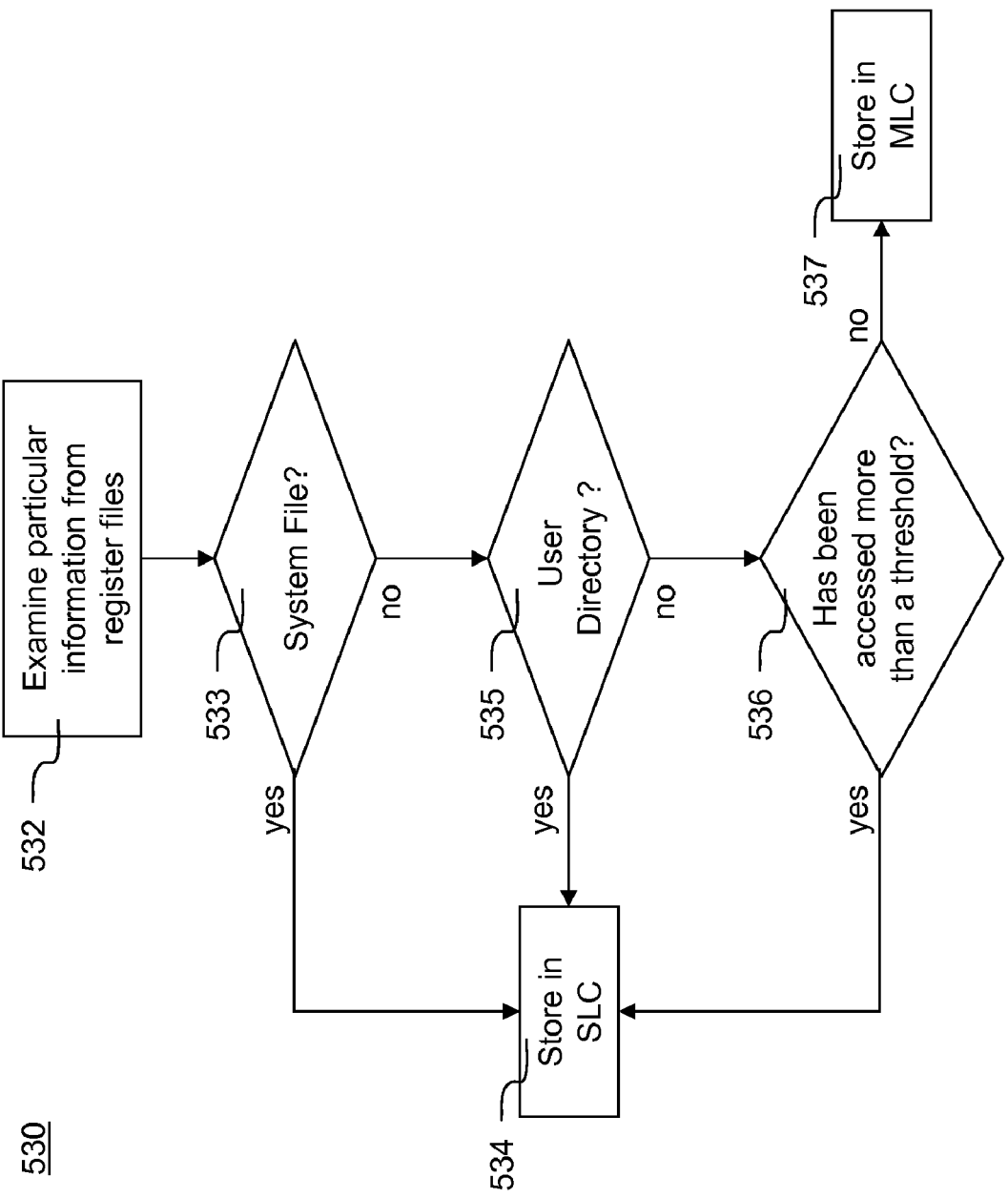

A second alternative process 530 is shown in FIG. 5B. Steps 532, 533, 534 and 535 of the second process 530 are similar to steps 522, 523, 524 and 525 of the first process 520. The difference is when the decision 535 becomes "no", or the data file in the data write request is a user data file. The process 530 moves to another decision 536 to determine whether the user file has been accessed more than a threshold. The threshold may be defined as following examples: 1) the user file has been accesses more than a predefined number of times; 2) data blocks of the user file are found in the data write cache (i.e., have recently been accessed); 3) previously modified time of the user file indicates very recent access; or 4) an access counter of the user file shows a high number of accesses (i.e., more than a predefined threshold). Any or all of the criteria may be implemented in the micro-controller 210 as logic, firmware or a combination of both. A user configurable table may be implemented to allow user to modify the default threshold. In another embodiment, new criterion may be defined by user through a programmable logic (e.g., field programmable gate array (FPGA)).

If "no" at the decision 536, that means the data file has not been accessed over the threshold. The process 530 moves to step 537 marking the data file to be stored in the MLC flash memory array. Otherwise, the data file has exceeded the threshold, therefore the process 530 moves back to step 534 marking the data file to be stored in the SLC flash memory array.

Figure 5D:
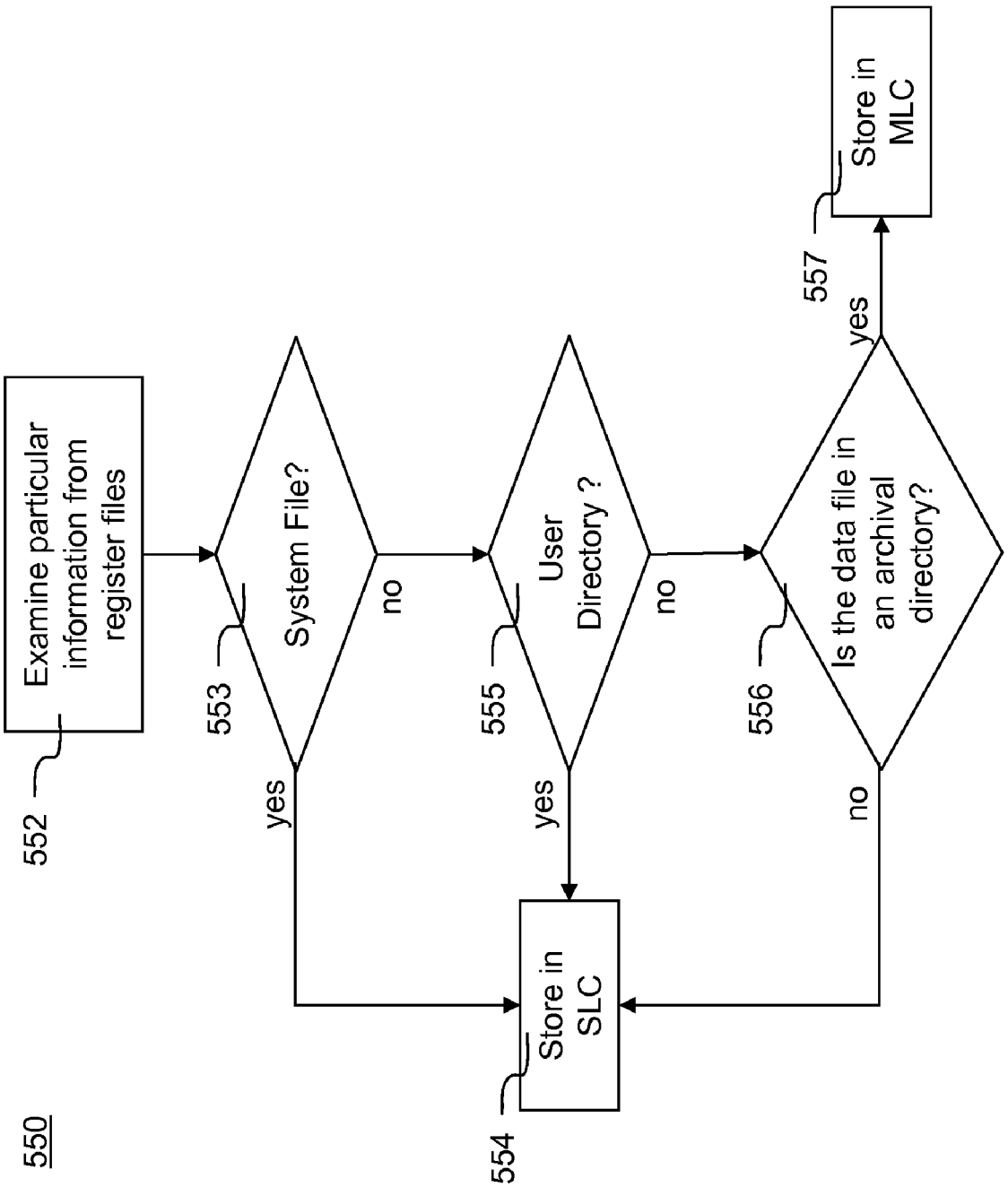
Figure 5E:
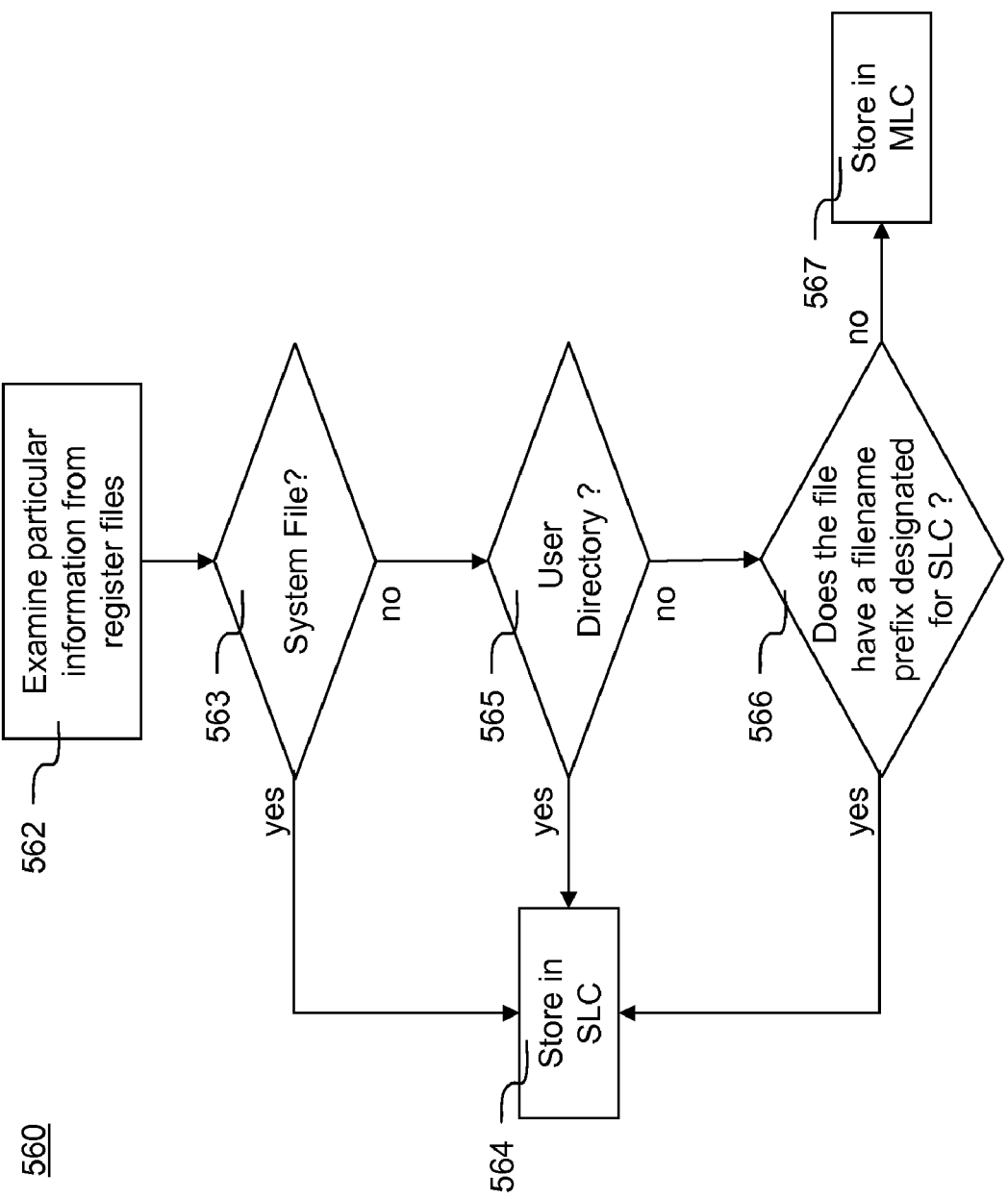

FIGS. 5C, 5D and 5E show a third, fourth and fifth alternative exemplary process 540, 550 and 560, respectively. Processes 540, 550 and 560 are very similar to the second process 530. The only difference is that the decisions 536, 546, 556 and 566 in processes 530, 540, 550 and 560. Instead of data file access frequency is checked in decision 536 of the second alternative process 530, the decision 546 of the third process 540 determines whether the data file is located in a directory designated for storing in the SLC flash memory array. If "yes", the data file is marked to be stored in "SLC" at step 544, otherwise the data file is marked to be stored in "MLC" at step 547. In one embodiment, the directory designated for storing in the SLC flash memory may be a directory for ongoing project data files, which are updated frequently hence requiring higher endurance of the SLC flash memory.

The fourth process 550 includes a decision 556 to determine whether the data file is located in a directory designated for archival directory. If "yes", the process 550 moves to step 557 marking the data file for storing in the MLC flash memory array. Otherwise the data file is marked to be stored in the SLC flash memory array at step 554. Although the third 540 and fourth 550 processes are shown as separate alternatives, it will be appreciated by those ordinary skilled in the art that the decisions 546 and 556 may be implemented in one process such that the data files in an archival directory and in an ongoing project directory are stored in the MLC and in SLC flash memory array, respectively.

Finally in the fifth alternative process 560, decision 566 determines or triages the data file based on file name. For example, a data file with a file name prefixed by "SLC" or equivalent is checked at decision 566. If "yes", the data file is marked to be stored in the SLC flash memory array at step 564. Otherwise marks the data file with "MLC" at step 567.

The alternative processes shown in FIGS. 5A-5E may be implemented using some of the unique characteristics of a host computer (e.g., the computing device 100 of FIG. 1), in which a hybrid SSD, according to an embodiment of the present invention, is configured as a secondary storage. The unique characteristics are generally found in an operating system of the computer.

FIG. 6 is a diagram illustrating major functions of an operating system (OS) 600 used for controlling and coordinating the computing device 100 of FIG. 1. An OS is a software (e.g., a module 125 of FIG. 1) that manages the sharing of the resources of a computer and provides programmers and users with an interface used to access those resources. An operating system processes system data and user input, and responds by allocating and managing tasks and internal system resources as a service to users and programs of the system. At the foundation of all system software, an operating system performs basic tasks such as controlling and allocating memory, prioritizing system requests, controlling input and output devices, facilitating networking and managing file systems. Most operating systems come with an application that provides a user interface for managing the operating system, such as a command line interpreter or graphical user interface. The operating system forms a platform for other system software and for application software. Exemplary OS includes Microsoft Windows®, Linux, Mac OS X.

The operating system 600 comprises a file system 642, a networking manager 644, a process manager 646, a memory manger 648 and one or more device drivers 650. The device driver 650 is a special computer software module to allow interaction with hardware devices such as printer, display monitor, keyboard, mouse, etc. The memory manager 648 coordinates various types of memory (e.g., register, cache. RAM, etc.) by tracking memory availability, allocating and de-allocating memory. The process manager 646 manages applications or services executed on the processor. The network manager 644 allows the computing device to communicate with other computing devices coupling to a data network. The file system 642 defines data structure of files and file folders (i.e., directories) in such way, the operating system 600 can store and retrieve the data in a secondary storage. Specific characteristics in the data structure of the file system 642 may be used for implementing the data file triage process in accordance with one embodiment of the present invention.

According to one embodiment of the present invention, the data file triage process shown in FIGS. 5A-5E may be implemented using idiosyncrasy of a file system—FAT16, which is a common file system used in Microsoft DOS and Windows operating system. FIGS. 7A-7D are diagrams and examples showing some of the data structures used in FAT16.

Shown in FIG. 7A is a diagram illustrating a first data structure of FAT16. Master Boot Record (MBR) 700 comprises the first sector (i.e., 512-byte boot sector or "Sector 0") of data on a secondary storage such as a hard disk or the exemplary hybrid SSD 200 of FIG. 2. Basis unit is sector which contains 512-byte of data. MBR 700 includes a boot code area 701, an optional drive signature 702, four primary partition records 703 and a MBR signature 707 (i.e., the last two bytes of MBR containing hex number "0xAA55"). The boot code 701 contains machine code instructions used for booting up a computer or computing system. Each of the primary partition records 703 comprises following information: a boot status flag 711, cylinder-head-sector (CHS) begin address 712, partition type 713, CHS end address 714, logical block address (LBA) of the first sector in the partition 715 and length of the partition in sectors 716. The cylinder-head-sector (CHS) begin address 712 and end address 714 are physical block addresses (PBA) of the SLC or MLC flash memory array In the hybrid SSD.

FIG. 7B shows a partition data structure 720, which includes a boot sector 721, additional reserved sectors 722, a first copy of file allocation table (FAT) 723, a second copy of FAT 724, root directory 725 and data region 726. The boot sector 721 includes at least the following information: bytes per sector 731, sectors per cluster 732, reserved sector count 733 (i.e., number of sectors before the first copy of FAT), number of copies of FAT 734 (i.e., almost always 2), total number of sectors in the partition 735, sectors per copy of FAT 736 and a partition record signature 737 (i.e., 2-byte containing "0xAA55"). Other data included in the boot sector 721 are not of interest for the purpose of the instant patent application, thus not listed.

The number of bytes per sector 731 is generally 512. The number of sectors per cluster 732 is a power of 2 between 1 and 128. One restriction is to limit the number of bytes per cluster under 32 KB. Any larger cluster size may result into a huge waste of secondary storage, because any data file containing data less than the size of the cluster still occupies the entire cluster. Each of the clusters in a data partition is referenced by a 16-bit cluster address in FAT16 (other size in other file system). Therefore, the total number of sectors required for each copy of FAT 736 can be calculated as follows:

Total sectors=(total clusters)×(size of address)/(bytes per sector)

Data files are stored in a cluster by cluster basis. When the size of a data file is smaller than that of a cluster, the data file occupies one cluster. When the size of a data file is larger than that of a cluster, the data file occupies more than one cluster and is represented by a chain of clusters. Representation of the chain of clusters is a single link list, which is stored in a file allocation table (FAT). And every data file is represented by a unique non-overlapping link list in the FAT.

An exemplary partial FAT 740 is shown in FIG. 7C. Each entry in the FAT 740 represents a logical address of one of the clusters in the data partition, one entry for each cluster. In other words, the entries in the FAT 740 have a one-to-one relationship with the clusters in the data partition. The top row lists logical cluster addresses from "0000" to "0004", while the left column lists the logical cluster addressed from "0000" to "0018". These addresses are represented in hexadecimal numbers or hex numbers (i.e., numbers with a radix or base, of 16). The first two clusters are reserved and indicated by "xxxx" 641 (e.g., "0001" is a reserved address). Other entries include numbers ranging from "0000" to "FFFF". "0000" 742 indicates a free cluster, "FFFF" indicates a termination cluster in a link, and numbers "0002" through "FFEF" represent used cluster with the value points to the next cluster.

In the example shown in FIG. 7C, there are four files/directories. A link list can represent a directory or a file. The first file is the root directory 744 represented by a link list starting at "0002", followed by "0009", "000A", "000B" and "0011". The content of "0011" is "FFFF", which indicates the end of the link list. The link list for the root directory may also be read by following solid arrows in the FAT 740. Value in each of the links in the link list represents next cluster until a terminator "FFFF" is reached. "File 1", "File 2" and "File 3" are other examples shown in FIG. 7C with link lists similarly constructed to the link list for the root directory 744.

FIG. 7D is a diagram showing file and directory data structure 750 in FAT16. The file and directory data structure 750 comprises a file name 751, a file extension 752, file attribute 753, file creation time 754, file creation date 755, first cluster the file is stored 756 and file size 757. The information stored in the file and directory data structure is referred to as metadata or characteristics of a data file. In view of the operation system, the data structure is the same for any file whether it is a system file, boot record, root directory, user directory, or user data file. Four examples of the data files are shown in FIG. 7D. The first example is for a valid file with a file name "config.sys", which is represented in American Standard Code for Information Interchange (ASCII) codes in the middle column. Examples 2 and 3 are two special directories referred to as a "dot" and a "dotdot" record, respectively. A hex number "2E" is shown in the first byte of the "dot" entry, while hex number "2E2E" is shown in the first two-byte of the "dotdot" entry. The "dot" and "dotdot" records are used for indicating a user directory including the current directory and a parent directory. Finally, in Example 4, a deleted file is shown with a hex number "E5" in the first byte of the data.

In the FAT16 file system, the contents of a data file are stored starting at the first cluster indicated in LBA. When the contents fill up the first cluster, the remaining contents are stored in the next cluster in the link list until the contents have been stored in entirety. If the data file is a directory, a "dot" record and a "dotdot" record are stored in the first cluster, instead of file contents. Since a "dot" or "dotdot" record includes a special first byte "2E", one method for distinguishing a directory from a regular data file is to check the first byte of the file contents.

Based on idiosyncrasy of the file system of an operating system such as examples shown in FIG. 7D, the data file triage methods may be performed with a specific technique. In one example, reading first and two bytes of the data file can be used for determining whether the data file is a user directory or not. In another example, reading the first cluster number of the data file can be used for determining whether the data file is a system file (e.g., cluster number less than two (2) for reserved system files). In yet another example, a first byte with hex number "E5" indicates a deleted file that is allowed to be reused.

Although the present invention has been described with reference to specific embodiments thereof, these embodiments are merely illustrative, and not restrictive of, the present invention. Various modifications or changes to the specifically disclosed exemplary embodiments will be suggested to persons skilled in the art. For example, whereas various exemplary data triage methods have been shown and described many other methods that can accomplish same purpose may also be used; whereas data structures of FAT16 are described and shown, file systems such as FAT 12, FAT32, NTFS, and others may be used to accomplish the same. In summary, the scope of the invention should not be restricted to the specific exemplary embodiments disclosed herein, and all modifications that are readily suggested to those of ordinary skill in the art should be included within the spirit and purview of this application and scope of the appended claims.

What is claimed is:

1. A hybrid solid state drive (SSD) apparatus comprising:
   an interface configured for receiving data transfer commands from a host computing device, each of the received data transfer commands includes either a data read or a data write request;
   a single-level cell (SLC) flash memory array;
   a multi-level cell (MLC) flash memory array;
   a micro-controller configured for controlling the interface, the SLC flash memory array and MLC flash memory array, the micro-processor extracts particular characteristics of a data file associated with said each of the received data transfer commands and then constructs a memory selection indicator for triaging the data file to be stored in either the SLC flash memory array or the MLC flash memory array based on one or more criteria derived from the particular characteristics, wherein said one or more criteria comprise storing a first set of data files, each data file of the first set having a file name with prefix "SLC" defined by a human user regardless of data file access frequency, into the SLC flash memory array and storing a second set of data files, each data file of the second set having a file name with prefix "MLC" defined by the human user regardless of data file access frequency, into the MLC flash memory array; and
   an address mapping memory, coupling to the micro-controller, configured to correlate logical block address (LBA) of the data file to a physical block address (PBA) associated with one of the SLC flash memory array and the MLC flash memory array according to the memory selection indicator.

2. The apparatus of claim 1 further comprises:
   a read cache configured to be a first buffer holding data blocks to be transferred to the host computing device; and a write cache configured to be a second buffer holding data blocks to be written to either the SLC or MLC flash memory array.

3. The apparatus of claim 2 further comprises one or more register files configured to hold the particular characteristics for the micro-controller.

4. The apparatus of claim 3 further comprises a memory switch configured to switch between the SLC flash memory array and the MLC flash memory array based on the memory selection indicator.

5. The apparatus of claim 1, wherein the memory selection indicator is associated with the LBA in the address mapping memory.

6. The apparatus of claim 1, wherein the one or more criteria further comprise the SLC flash memory array being configured to store system files and user directories and the MLC memory array being configured to store user files.

7. The apparatus of claim 1, wherein the one or more criteria further include the SLC flash memory array being configured to store more frequent accessed files and the MLC flash memory array being configured to store less frequent accessed files.

8. The apparatus of claim 7, wherein the more frequent accessed files are on-going project data files and the less frequent accessed files are archival data files.

9. The apparatus of claim 1, wherein the particular characteristics of the data file includes the data file's name.

10. A method of writing data in a hybrid solid state drive (SSD) comprising:
receiving data transfer commands;
determining whether each of the received data transfer commands is a data read or a data write request;
when the data write request is determined,
extracting particular characteristics of a data file associated with said each of the received data transfer commands;
constructing a memory selection indicator for triaging the data file to be stored in either a SLC flash memory array or a MLC flash memory array based on one or more criteria derived from the particular characteristics, wherein said one or more criteria comprise storing a first set of data files, each data file of the first set having a file name with prefix "SLC" defined by a human user regardless of data file access frequency, into the SLC flash memory array and storing a second set of data files, each data file of the second set having a file name with prefix "MLC" defined by the human user regardless of data file access frequency, into the MLC flash memory array;
correlating logical block address (LBA) of the data file to a physical block address (PBA) associated with one of the SLC flash memory array and the MLC flash memory array according to the memory selection indicator; and
writing data blocks to the physical block address accordingly.

11. The method of claim 10 further comprises pre-storing the data blocks associated with LBA to a write cache when the data write request is determined.

12. The method of claim 11 further comprises storing the particular characteristics of the data file into one or more register files of the micro-controller.

13. The method of claim 10, wherein the one or more criteria further comprise the SLC flash memory array being configured to store system files and user directories and the MLC memory array being configured to store user files.

14. The method of claim 10, wherein the one or more criteria further include the SLC flash memory array being configured to store more frequent accessed files and the MLC flash memory array being configured to store less frequent accessed files.

15. The method of claim 14, wherein the more frequent accessed files are on-going project data files and the less frequent accessed files are archival data files.

16. The method of claim 10, wherein the particular characteristics of the data file includes the data file's name.

17. The method of claim 10, wherein the particular characteristics of the data file includes the data file's size.

18. The method of claim 10, wherein the particular characteristics of the data file includes said LBA of the data file.

19. The method of claim 10, wherein the particular characteristics of the data file includes the data file's type.

20. The method of claim 10, wherein the particular characteristics of the data file includes the data file's access frequency.

* * * * *